Dec. 2, 1924.
F. G. FOLBERTH ET AL
WINDSHIELD CLEANER
Filed May 21, 1923
1,518,058
3 Sheets-Sheet 1
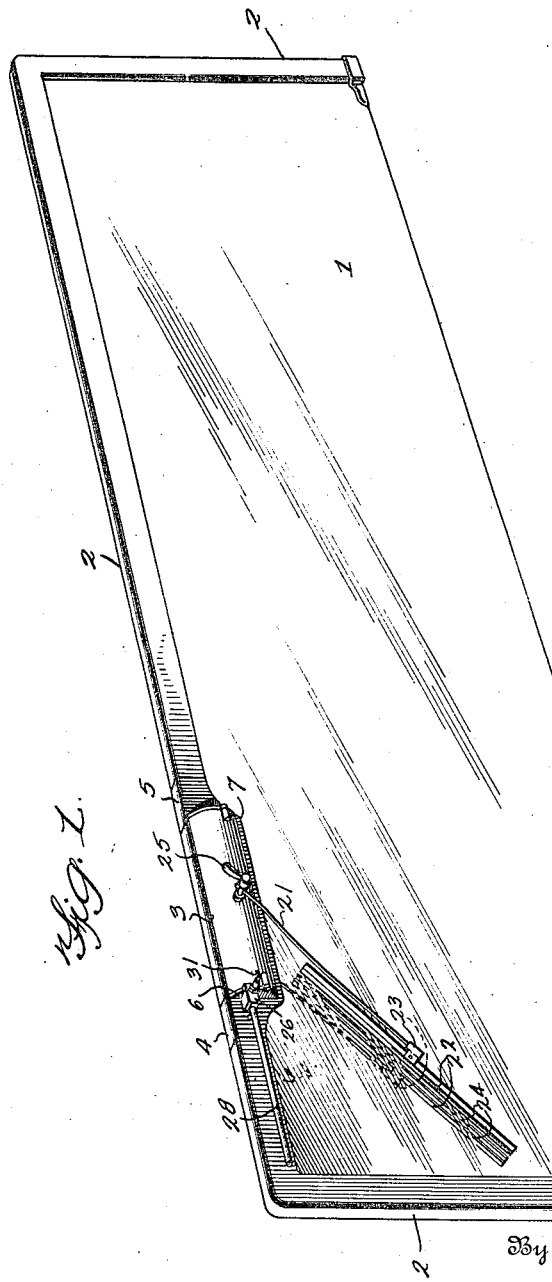
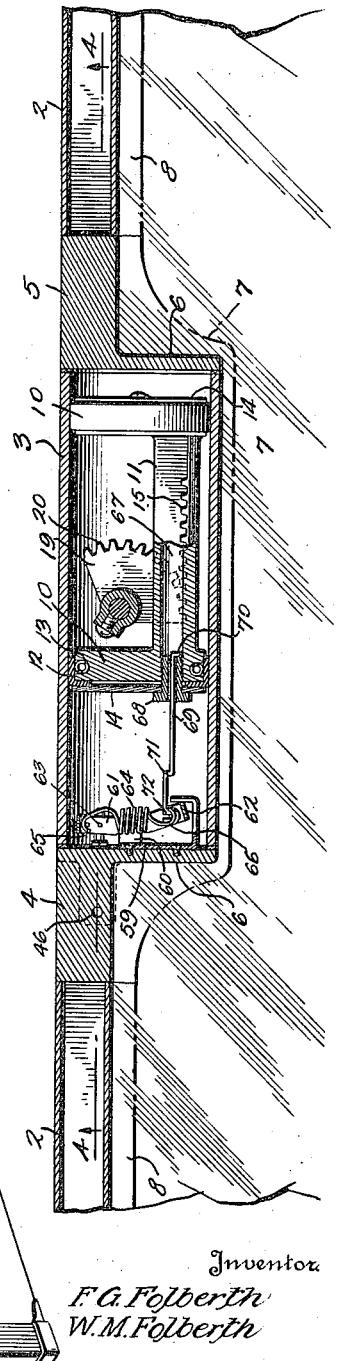
Inventors
F. G. Folberth
W. M. Folberth
By Ch. Farbman
Attorney Dec. 2, 1924.  
F. G. FOLBERTH ET AL  
WINDSHIELD CLEANER  
Filed May 21, 1923     3 Sheets—Sheet 2
1,518,058
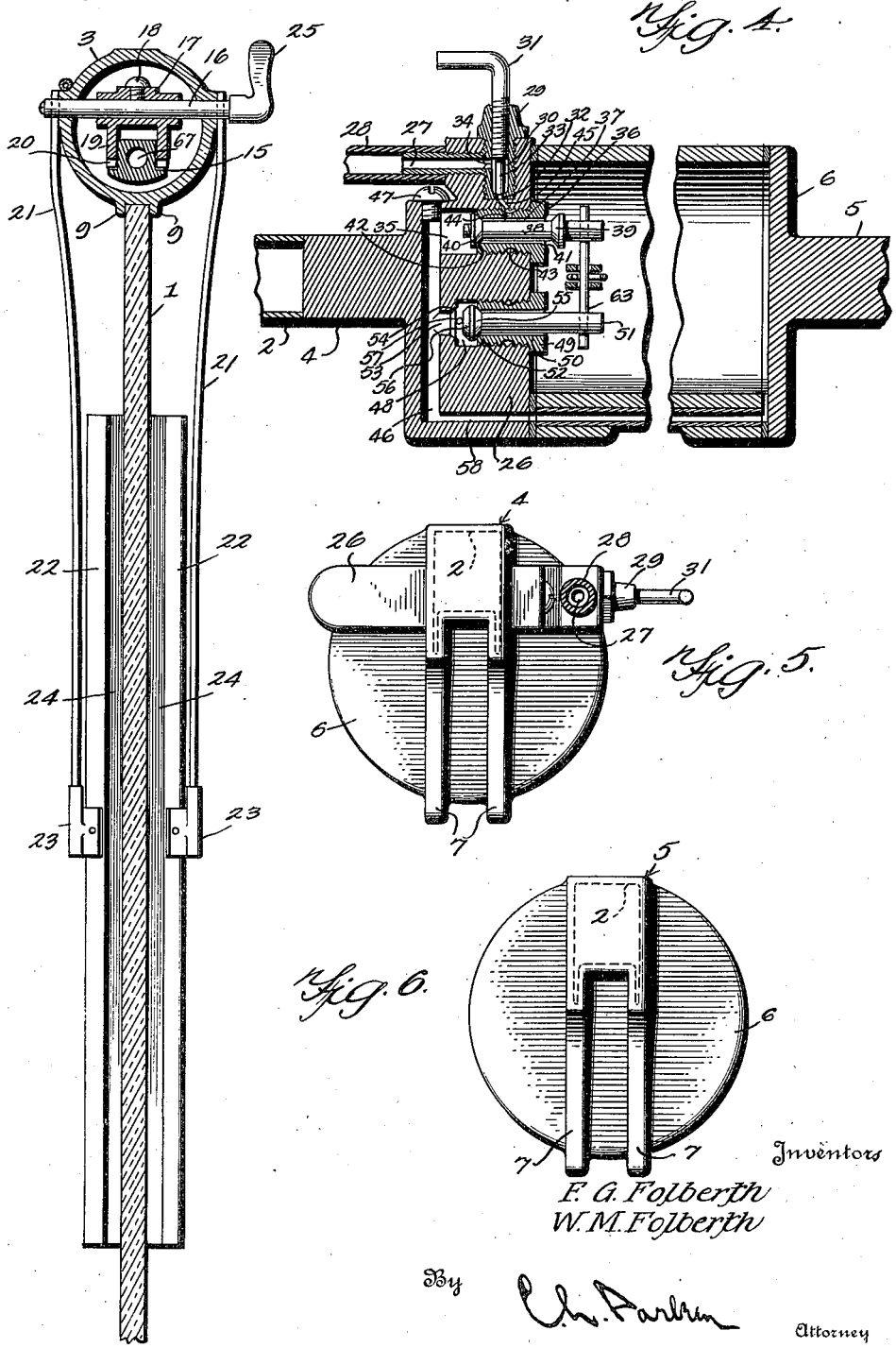
Inventors  
F. G. Folberth  
W. M. Folberth  
By  
Attorney Dec. 2, 1924. 1,518,058
F. G. FOLBERTH ET AL
WINDSHIELD CLEANER
Filed May 21, 1923   3 Sheets-Sheet 3
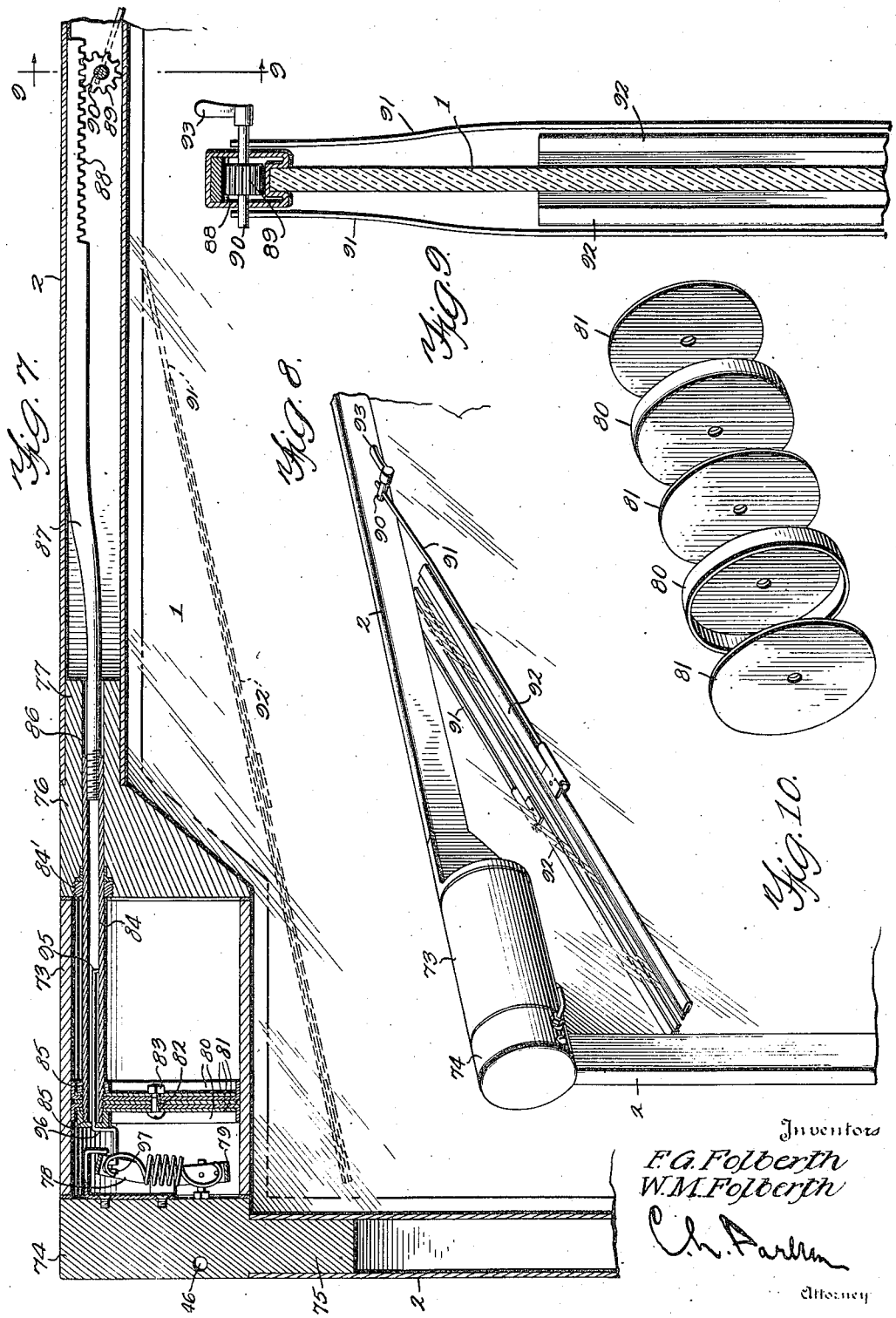
Inventors
F. G. Folberth
W. M. Folberth
Attorney Patented Dec. 2, 1924.

1,518,058

UNITED STATES PATENT OFFICE.

FREDERICK G. FOLBERTH AND WILLIAM M. FOLBERTH, OF CLEVELAND, OHIO, ASSIGNORS TO THE FOLBERTH AUTO SPECIALTY COMPANY, OF CLEVELAND, OHIO, A CORPORATION OF OHIO.

WINDSHIELD CLEANER.

Application filed May 21, 1923. Serial No. 640,577.

*To all whom it may concern:*

Be it known that we, FREDERICK G. FOLBERTH and WILLIAM M. FOLBERTH, citizens of the United States, residing at Cleveland, in the county of Cuyahoga and State of Ohio, have invented certain new and useful Improvements in Windshield Cleaners, of which the following is a specification.

This invention relates to windshield cleaners, and more particularly to automatic, power operated cleaners.

An object of the invention is the provision of a windshield cleaner in which the motor casing is built into the frame of the windshield similar to the construction disclosed in our prior Patent No. 1,420,538, granted June 20, 1922, and an object is to provide improved means for connecting the casing to the frame.

A further object of the invention is to provide means for driving a transversely mounted operating shaft disposed exteriorly of the motor casing.

A further object is to provide means for cleaning both sides of the windshield.

In the accompanying drawings, we have shown several embodiments of the invention. In this showing:

Figure 1 is a perspective view of a windshield and windshield frame showing the invention applied, Figure 2 is a vertical longitudinal sectional view through the frame and motor casing, Figure 3 is a transverse sectional view through the motor casing, Figure 4 is a horizontal sectional view on line 4—4 of Figure 2, Figure 5 is an end elevation of the motor casing, Figure 6 is a similar view from the opposite end, Figure 7 is a vertical longitudinal sectional view of a windshield frame showing another form of the invention, Figure 8 is a perspective view of a windshield frame showing the form of cleaner disclosed in Figure 7, Figure 9 is a transverse sectional view on line 9—9 of Figure 7, and Figure 10 is a detail view of the piston shown in Figure 7.

Referring to Figures 1 to 6 of the drawings, the reference numeral 1 designates a windshield glass mounted in a windshield frame 2 of ordinary construction. A portion of the top of the windshield frame in front of the driver's seat is cut-away and a motor casing 3 arranged therein. This motor casing is provided with heads 4 and 5 having portions 6 which are adapted to close the ends of the motor casing. The heads then extend outwardly and are shaped similar to the shape of the frame and connected thereto. As shown in Figures 5 and 6 of the drawings, the heads are provided with webs 7 adapted to be arranged on opposite sides of the glass forming the windshield. The frame is likewise provided with webs 8 between which the glass is received and the motor casing is provided with webs 9 arranged on opposite sides of the glass. The frame may be of any desired construction and shape and the extended portions of the heads 4 and 5 are shaped to simulate the frame construction.

An actuating member is arranged within the motor casing. In the form of the invention shown in Figures 1 to 6 of the drawings, this actuating member consists of a pair of spaced pistons 10 connected by a web 11. The pistons are provided with suitable packing to prevent leakage. As shown, a cup 12 is arranged on each of the pistons and is forced outwardly by a coil spring 13 arranged in a peripheral groove in the piston. An end plate 14 retains the cup in position. The web 11 is provided with side portions 15 of reduced thickness, having rack teeth formed thereon. A shaft 16 is arranged transversely of the motor casing and a hub 17 is mounted on this shaft. The hub is secured to the shaft by means of a set screw 18. This hub is provided with a pair of segmental or arcuate plates 19 having gear teeth 20 formed thereon. The teeth 20 are adapted to mesh with the rack teeth formed on the portions 15 of the web. It will be apparent that the reciprocation of the pistons and web will oscillate the shaft 16. Cleaner arms 21 are mounted on opposite ends of the shafts and these cleaner arms are adapted to receive cleaner elements 22 which contact with the opposite sides of the windshield. The cleaner elements are secured to the arms by suitable retaining members 23 and are provided with strips of rubber or other suitable material, as indicated at 24, which are adapted to clean the surface of the windshield. The inner end of the shaft is provided with a handle or operating crank 25 to permit operation of the cleaner by hand if desired.

Suitable means are provided for connecting the motor casing to a source of pressure or suction to reciprocate the pistons 10. As shown, the head 4 is provided with an extension 26. This extension is provided with a threaded opening adapted to receive a tube 27. The end of the tube projects from the head and is adapted to receive the end of a rubber hose 28 or other conduit connected to a suitable source of differential pressure. The extension is provided with a threaded opening adapted to receive a plug 29. This plug is provided with a central bore 30, the outer portion of which is threaded to receive a valved member 31. The bore terminates inwardly of the inner end of the plug and the end of the plug is provided with a port of passage 32 communicating with a central bore, thus forming a valve seat for a valve 33 formed on the lower end of the valve member. The plug is provided with a transverse port or passage 34, communicating with the inner end of the tube 27. The extension is provided with a passage 35, a portion of which is threaded and is adapted to receive a plug 36, extending into the end of the cylinder. This plug is provided with a central passage 37. A valve member 38, of smaller diameter than the passage 37 is arranged within the passage and is provided with valves 39 and 40 adjacent its ends. These valves are adapted to cooperate with valve seats 41 and 42, formed on the ends of the plug 36. The plug 36 is provided with a circumferential groove 43 and this groove communicates with the central passage by means of a transverse port 44. The groove also communicates with the passage 32 through a port 45 formed in the extension. The passage 35 communicates with a transverse passage 46. The end of this passage is closed by a plug 47. The extension is further provided with a passage 48, extending into the cylinder and a portion of this passage is threaded for the reception of a plug 49. This plug is provided with a central passage 50 and is adapted to receive a valve stem 51, slightly smaller in diameter than the diameter of the passage. The plug is provided with a valve seat 52 at its inner end. Beyond the plug, the passage is reduced in diameter, as at 53, and a valve seat 54 is formed on the shoulder produced by the reduced portion. The stem 51 is provided with a pair of valves 55 and 56 adapted to engage the valve seats 52 and 54, respectively. Between the valve seats 52 and 54, there is provided an opening 57 communicating with the atmosphere. The end of the passage 56 communicates with a longitudinal passage 58 extending to the opposite end of the motor casing.

The valve stems 36 and 51 are adapted to be actuated by the movement of the piston to shift them and disengage one of their respective valves from its valve seat at the end of each stroke of the piston, and suitable snap-over mechanism is provided to cause a positive movement of the valves from one position to another. As shown, a supporting member 59 is secured to the inner face of the head 4 and this supporting member is provided with a pair of substantially parallel arms 60 adapted to pivotally receive a pair of yokes 61 and 62. The yoke 61 carries a pin 63 which is secured to the valve stems 36 and 51. A coil spring 64 is connected to the yokes. As shown, the coil spring is provided with a hook 65 on its upper end and a similar hook 66 on its lower end. These hooks are arranged over pins carried by the yokes 61 and 62. The web 11 is provided with a central passage 67 and a plug 68 is arranged in the end of this passage. An actuating member 69 extends through a central opening in the plug and is provided with a down-turned end 70. The actuating member is provided with an offset intermediate its ends forming a shoulder 71. The end of the actuating member is provided with a hook 72 adapted to engage a pin on the yoke 62.

In the form of the invention shown in Figures 7 to 10 of the drawings, a motor casing 73 is arranged in a corner of the windshield frame. One end of the casing is closed by a head 74 having a downwardly extending portion 75 adapted to be received in the side of the windshield frame. The other end of the casing is closed by a head 76 having a horizontal extension 77 adapted to be received in the top of the windshield frame. The head 74 is provided with ports or passages similar to the head 4 to permit communication between the source of differential pressure and the opposite ends of the cylinder and the valves (not shown) are controlled by a pair of pivoted yokes 78 and 79 similar to the yokes 61 and 62. In this form of the invention, a single piston is employed. As shown in Figure 10 of the drawings, the piston consists of a plurality of leather cups 80 having steel disks 81 arranged between them and also provided with similar disks arranged on their outer faces. The disks and cups are secured to each other by means of a bolt or screw 82 having a nut 83 arranged on its end. A tube 84 is secured to the piston and forms a piston rod. As shown, the end of the tube is threaded and is adapted to receive suitable tubular nuts 85 arranged on opposite sides of the piston. The tube 84 extends through a longitudinal opening 86 in the head 76 and is internally threaded, at its outer end, to receive threads formed on the inner end of a rod 87. This rod extends through the interior of the windshield frame a suitable distance and is provided with rack teeth 88 adjacent its outer end. These teeth are adapted to mesh with a pinion 89 arranged within the windshield frame and mounted on a shaft 90. Cleaner arms 91 are arranged on opposite sides of the windshield and carried by the shaft 90. These cleaner arms are provided with suitable cleaner elements 92 adapted to contact with the opposite sides of the windshield. A handle 93 is arranged on the shaft to permit manual operation. In this form of the invention, a valve actuating member 94 extends into the tube 84 and is provided with a down-turned end 95. It is also provided with a shoulder 96 adjacent its other end and a hook 97 engaging a pin on the loop 78.

In the operation of the form of the invention shown in Figures 1 to 6 of the drawings, the opposite ends of the motor casing are alternately connected to a source of differential pressure by the shifting of the valves 36 and 51. With the parts in the position shown in Figure 2 of the drawings, the down-turned end 70 of the actuating member 69 has just engaged the inner face of the plug 68, pulling the actuating member to the right in the drawings. This moves the loop 62 on its pivot and when the lower end of the spring 64 reaches a point where the line of tension of the spring is beyond the pivot of the loop 60, the upper loop is moved to the right, which moves the valves to the position shown in Figure 4 of the drawings, causing the valve 40 to engage the valve seat 44 and disengage the valve 39 from the valve seat 41. At the same time, the valve 55 is moved into engagement with its seat and the valve 56 disengaged from its seat. This places the right end of the cylinder in communication with the atmosphere through the passages 46 and 58 and the opening 57. The left end of the cylinder is disconnected from the atmosphere by the engagement of the valve 55 with its seat. At the same time, the left end of the motor casing is connected to the source of differential pressure by the disengagement of valve 39 and is disconnected from the atmosphere by the engagement of the valve 40 with its seat. When the valves are moved in the opposite direction, the engagement of valve 39 with its seat cuts off the left end of the cylinder from the source of differential pressure and the disengagement of valve 40 connects the right end of the cylinder to the source of differential pressure. Similarly, the disengagement of the valve 55 from its seat connects the left end of the cylinder to the atmosphere and the engagement of the valve 56 with its seat cuts off the right end of the cylinder from the atmosphere. The reciprocation of the pistons oscillates the shaft 16 and thus oscillates the cleaner elements 24.

In the form of the invention shown in Figures 7 to 10 of the drawings, the operation of the piston and valve mechanism is the same, thus reciprocating the tube 84 and the rod 87. The head 76 is provided with suitable packing 84' surrounding the rod 84 to prevent leakage. The reciprocation of the piston actuates the valves by the engagement of the tubular nut 85 with the shoulder 96 as shown at the end of one stroke and with the down-turned end 95 of the rod 94 at the end of the other stroke. The reciprocation of the rod 87 oscillates the shaft 90 through the pinion 89 and rack teeth 88.

It is to be understood that the forms of the invention herewith shown and described are to be taken as preferred examples of the same and that various changes in the shape, size, and arrangement of parts may be resorted to without departing from the spirit of the invention or the scope of the subjoined claims.

We claim:

1. The combination with a windshield frame having a cut-out portion, of a windshield cleaner comprising a motor casing arranged in said cut-out portion, a cleaner element adapted to travel over the surface of the windshield, an actuating member mounted in said casing, and connecting means between said actuating member and said cleaner element said connecting means extending from said casing through said frame longitudinally of said frame.

2. The combination with a windshield frame having an interrupted portion, of a windshield cleaner comprising a motor casing arranged in the interrupted portion of the frame, and forming a continuation thereof, heads arranged on the ends of said casing and connected to the adjacent portions of the frame, a cleaner element adapted to travel over the surface of the windshield, an actuating member arranged in said casing, and connecting means between said actuating member and said cleaner element, said connecting means extending from said casing through said frame longitudinally of said frame.

3. The combination with a windshield frame having an interrupted portion, of a windshield cleaner comprising a motor casing arranged in the interrupted portion of the frame and forming a continuation thereof, heads arranged on the opposite ends of said motor casing, said heads being provided with extensions similar in shape to the shape of the windshield frame and being connected thereto, a cleaner element adapted to travel over the surface of the windshield, an actuating member arranged in said casing, and connecting means between said actuating member and said cleaner element, said connecting means extending from said casing through said frame longitudinally of said frame.

4. The combination with a windshield frame having a hollow portion, of a motor casing forming a part of said frame, an actuating member arranged in said casing, a rod connected to said actuating member and projecting from said casing into the hollow portion of the frame, a shaft rotatably mounted in said frame, connecting means between said rod and said shaft, and a cleaner element carried by said shaft.

5. The combination with a windshield frame having a hollow portion, of a motor casing forming a part of said frame, an actuating member arranged in said casing, a rod connected to said actuating member and projecting from said casing into the hollow portion of the frame, a shaft rotatably mounted in said frame, a pinion mounted on said shaft within said frame, said rod being provided with rack teeth meshing with said pinion, and a cleaner element carried by said shaft.

6. The combination with a hollow windshield frame having a cut out portion, of a windshield cleaner comprising a motor casing arranged in said cut out portion, said casing being provided with heads arranged at each end and adapted to separate the motor from the remainder of the frame, said heads being provided with extensions adapted to be received in the adjacent portions of the frame, a cleaner element adapted to travel over the surface of a windshield, an actuating member mounted in said casing, and connections between said actuating member and said cleaner element.

7. The combination with a hollow windshield frame having a cut out portion, of a windshield cleaner comprising a motor casing arranged in said cut out portion, said casing being of greater cross sectional area than said frame and being provided with heads arranged at each end and adapted to separate the motor casing from the remainder of the frame, said heads being provided with extensions of substantially the same size as said frame and adapted to abut the ends of the adjacent portion of the frame and close them, a cleaner element adapted to travel over the surface of the windshield, an actuating member mounted in said casing, and connections between said actuating member and said cleaner element.

In testimony whereof, we affix our signatures.

FREDERICK G. FOLBERTH.
WILLIAM M. FOLBERTH.